(12) United States Patent
Koellisch et al.

(10) Patent No.: US 6,474,189 B1
(45) Date of Patent: Nov. 5, 2002

(54) APPARATUS FOR MOUNTING A FOOT PEDAL AND A STEERING COLUMN TO A VEHICLE

(75) Inventors: David Koellisch, Lafayette, IN (US); Mark A. Cartwright, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/697,824

(22) Filed: Oct. 26, 2000

(51) Int. Cl.[7] ................................................ B62D 1/18
(52) U.S. Cl. ............................ 74/493; 74/512; 280/775
(58) Field of Search ..................... 74/493, 512; 280/775

(56) References Cited

U.S. PATENT DOCUMENTS

| | | |
|---|---|---|
| 3,198,030 A | 8/1965 | Miller et al. |
| 3,245,282 A | 4/1966 | Kimberlin |
| 4,449,419 A | 5/1984 | Soler Bruguera |
| 5,131,287 A | 7/1992 | Stromberg |
| 5,259,264 A | 11/1993 | Bodin et al. |
| 5,613,404 A * | 3/1997 | Lykken et al. ................ 74/493 |

FOREIGN PATENT DOCUMENTS

DE 24 30 546 * 1/1976

* cited by examiner

Primary Examiner—William C Joyce
(74) Attorney, Agent, or Firm—Tarolli, Sundheimm, Covell, Tummino & Szabo L.L.P.

(57) ABSTRACT

An apparatus for mounting a foot pedal and a steering column to a vehicle, the apparatus having a mounting bracket (10) connectable with a vehicle frame. The foot pedal (26) which controls a vehicle operation is pivotally connected to the mounting bracket (10) by a pivot shaft (30). The steering column (50) is pivotally connected to the mounting bracket (10) by the pivot shaft (30). The steering column (50) includes a steering column member (90) connectable with a steering wheel (94) and rotatable to turn steerable vehicle wheels. A locking mechanism (140) locks the steering column (50) in any one of a plurality of pivot positions relative to the mounting bracket (10).

14 Claims, 3 Drawing Sheets

APPARATUS FOR MOUNTING A FOOT PEDAL AND A STEERING COLUMN TO A VEHICLE

FIELD OF THE INVENTION

The present invention relates to an apparatus for mounting a foot pedal, which controls vehicle operation, and a steering column to a vehicle.

BACKGROUND OF THE INVENTION

Usually, foot pedals which control vehicle operation are pivotally connected to a vehicle frame by a mounting mechanism. A steering column is connected with the vehicle frame by a separate mounting mechanism. Accordingly, two mounting mechanisms are used to connect the steering column and the foot pedals to a vehicle.

SUMMARY OF THE INVENTION

The present invention provides an apparatus which mounts a foot pedal and a steering column to a vehicle. The apparatus includes a mounting bracket connectable with a vehicle frame. A foot pedal which controls a vehicle operation is pivotally connected to the mounting bracket by a pivot shaft. A steering column is pivotally connected to the mounting bracket by the pivot shaft. The steering column includes a steering column member connectable with a steering wheel and rotatable to turn steerable vehicle wheels. A locking mechanism locks the steering column in any one of a plurality of pivot positions relative to the mounting bracket.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
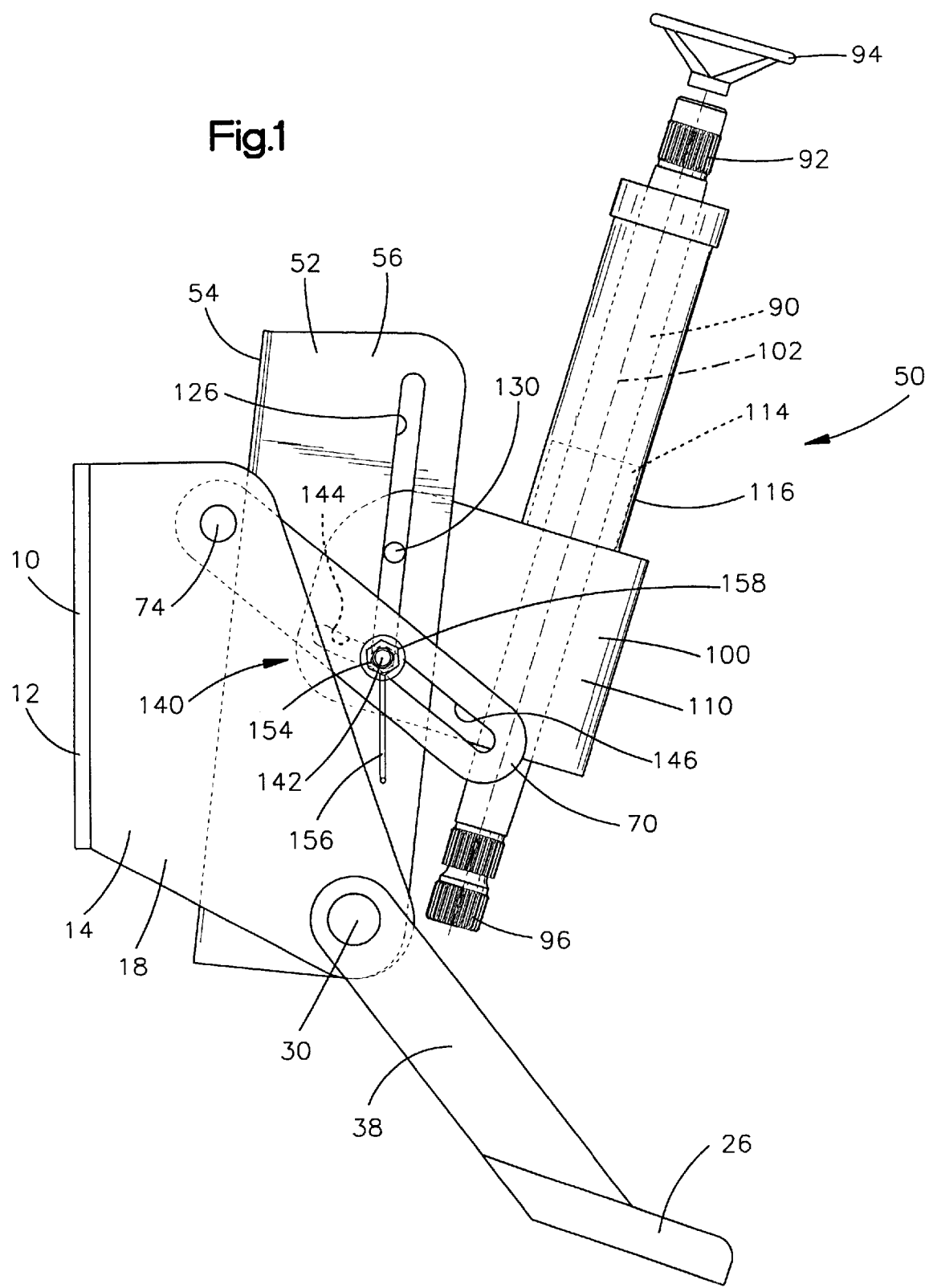
FIG. 1 is a schematic side view of an apparatus of the present invention showing foot pedals and a steering column in a first position.

The present invention includes a mounting bracket 10 (FIGS. 1–3) connectable with a vehicle frame, as is known in the art. The mounting bracket 10 has a rear wall 12 and a U-shaped portion 14 (FIG. 3) connected with the rear wall. The U-shaped portion 14 can be connected with the rear wall 12 by welding.

The U-shaped portion 14 has a back wall 16 engaging the rear wall 12. A pair of side walls 18 and 20 extend from the back wall 16. The side walls 18 and 20 extend parallel to each other and generally perpendicular to the back wall 16.

A pair of foot pedals 26 and 28 (FIGS. 1–3) are pivotally connected to the mounting bracket 10 by a pivot shaft 30. The foot pedals 26 and 28 are engageable by a foot of an occupant of the vehicle to control vehicle operation. The foot pedals 26 and 28 may be used to control braking of the vehicle or operation of a clutch, as is known in the art.

The side wall 18 (FIG. 3) of the mounting bracket 10 has an opening 34 and the side wall 20 has an opening 36. The foot pedal 26 has an arm 38 with an opening 40. The foot pedal 28 has an arm 42 with an opening 44. The pivot shaft 30 extends through the openings 34 and 36 in the side walls 18 and 20 and through the openings 40 and 44 in the foot pedals 26 and 28 to pivotally connect the foot pedals to the mounting bracket 10.

The pivot shaft 30 (FIGS. 1–3) also pivotally connects a steering column 50 to the mounting bracket 10. The pivot shaft 30 extends through a bracket member 52 (FIG. 3) of the steering column 50. The bracket member 52 has a back wall 54 and two side walls 56 and 58. The side walls 56 and 58 extend generally parallel to each other and perpendicular to the back wall 54. The side wall 56 of the bracket member 52 has an opening 62 and the side wall 58 has an opening 64. The pivot shaft 30 extends through the openings 62 and 64 to pivotally connect the steering column 50 to the mounting bracket 10.

A pair of arms 70 and 72 (FIGS. 1–3) extends from the mounting bracket 10 to the bracket member 52 of the steering column 50. The arms 70 and 72 are pivotally connected to the mounting bracket 10 by a pivot shaft 74. The side wall 18 (FIG. 3) of the mounting bracket 10 has an opening 78 and the side wall 20 has an opening 80. The arm 70 has an opening 82 and the arm 72 has an opening 84. The pivot shaft 74 extends through the openings 78 and 80 in the side walls 18 and 20 and through the openings 82 and 84 in the arms 70 and 72 to pivotally connect the arms to the mounting bracket 10.

The steering column 50 (FIGS. 1–2) includes a rotatable steering column member 90. The steering column member 90 has an end 92 connectable with a steering wheel 94 in a manner known in the art. An end 96 of the steering column member 90, opposite from the end 92, is connectable with a universal joint (not shown). The universal joint connected with the end 96 of the steering column member 90 is connected with a mechanism (not shown) designed to transmit movement of the steering column member 90 to a steering gear and permit movement of the steering column member relative to the mechanism, as is known in the art.

A support 100 supports the steering column member 90 for rotation about a longitudinal axis 102 of the steering column member. Upon rotation of the steering wheel 94, the steering column member 90 rotates about the longitudinal axis 102. Upon rotation of the steering column member 90 about the longitudinal axis 102, steerable vehicle wheels (not shown) are turned, as is known in the art.

The support 100 (FIGS. 1 and 2) has a main body 110 through which the steering column member 90 extends. The main body 110 is made from casting and may have any desired shape. The main body 110 has a cylindrical portion 114. A tube 116, through which the steering column member 90 extends, is press fit on the cylindrical portion 114. A pair of bearings 120 (FIG. 3) support the steering column member 90 for rotation relative to the support 100.

The side wall 56 of the bracket member 52 has a slot 126. The side wall 58 of the bracket member 52 has a slot 128 extending generally parallel to the slot 126. A steering column pivot shaft 130 pivotally connects the support 100 with the bracket member 52. The pivot shaft 130 extends through an opening 132 in the main body 110 of the support 100. The pivot shaft 130 also extends through the slots 126 and 128 in the side walls 56 and 58. The pivot shaft 130 is movable along the slots 126 and 128 relative to the bracket member 52 in a direction extending transverse to a longitudinal extent of the steering column pivot shaft 130 and extending transverse to a longitudinal extent of the pivot shaft 30.

A locking mechanism 140 locks the steering column 50 in any one of a plurality of pivot positions relative to the mounting bracket 10. The locking mechanism 140 locks the support 100 in any one of a plurality of pivot positions relative to the bracket member 52. The locking mechanism 140 also locks the steering column pivot shaft 130 in any one of a plurality of positions along the slots 126 and 128 relative to the bracket member 52.

The locking mechanism 140 (FIGS. 1–3) includes a locking shaft or bolt 142 which extends through an arcuate slot 144 in the main body 110 of the support 100. The bolt 142 also extends through the slots 126 and 128 in the side walls 56 and 58 of the bracket member 52. Furthermore, the bolt 142 extends through slots 146 and 148 in the arms 70 and 72.

The locking mechanism 140 includes a nut 154 which is threaded onto the bolt 142. A handle 156 extends from the nut 154. The handle 156 is movable by an occupant of the vehicle to actuate the locking mechanism 140. The bolt 142 (FIG. 3) extends through a pair of washers 158 which engage the arms 70 and 72.

The locking mechanism 140 presses the arms 70 and 72 toward each other and against the side walls 56 and 58 of the bracket member 52. The side walls 56 and 58 frictionally engage the support 100 to prevent movement of the support and the steering column pivot shaft 130 relative to the bracket member 52. The arms 70 and 72 frictionally engage the bracket member 52 to prevent movement of the steering column 50 relative to the mounting bracket 10.

Although the locking mechanism 140 is shown as a bolt 142 with a nut 154, it is contemplated that the locking mechanism may have a different construction. The locking mechanism may have any construction that presses the arms 70 and 72 against the bracket member 52 with sufficient force to prevent movement of the support 100 relative to the bracket member and the steering column 50 relative to the mounting bracket 10.

Upon pivoting the handle 156 in a counterclockwise direction, as viewed in FIG. 1, the nut 154 is partially unscrewed from the bolt 142. When the nut 154 is unscrewed from the bolt 142, the support 100 may be pivoted about the pivot shaft 130 relative to the bracket member 52 and the pivot shaft 130 may be moved along the slots 126 and 128 in the side walls 56 and 58 of the bracket member. Also, the bracket member 52 may be pivoted relative to the mounting bracket 10.

Figure 2:
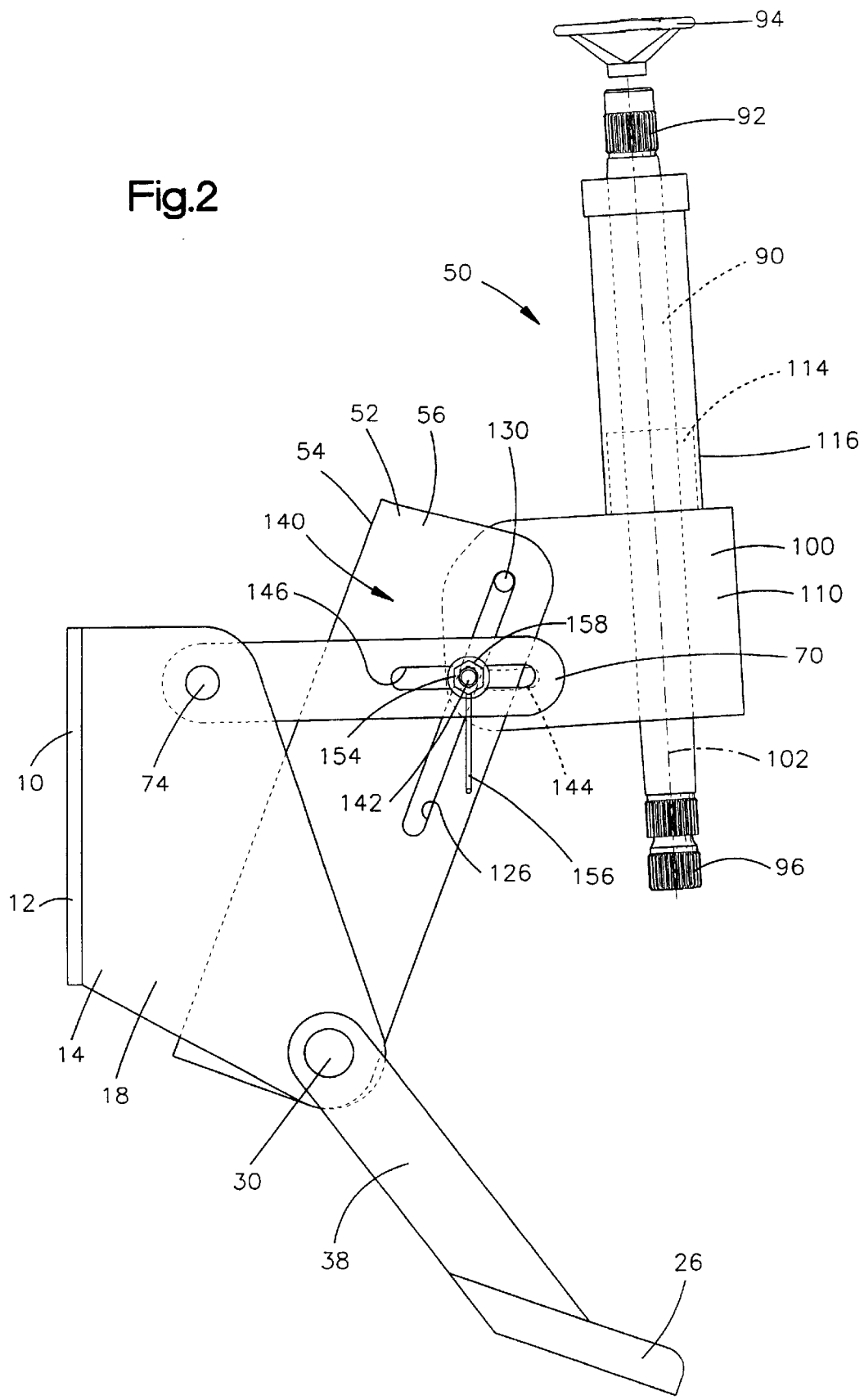
FIG. 2 is a view similar to FIG. 1 showing the steering column in a second position.
Figure 3:
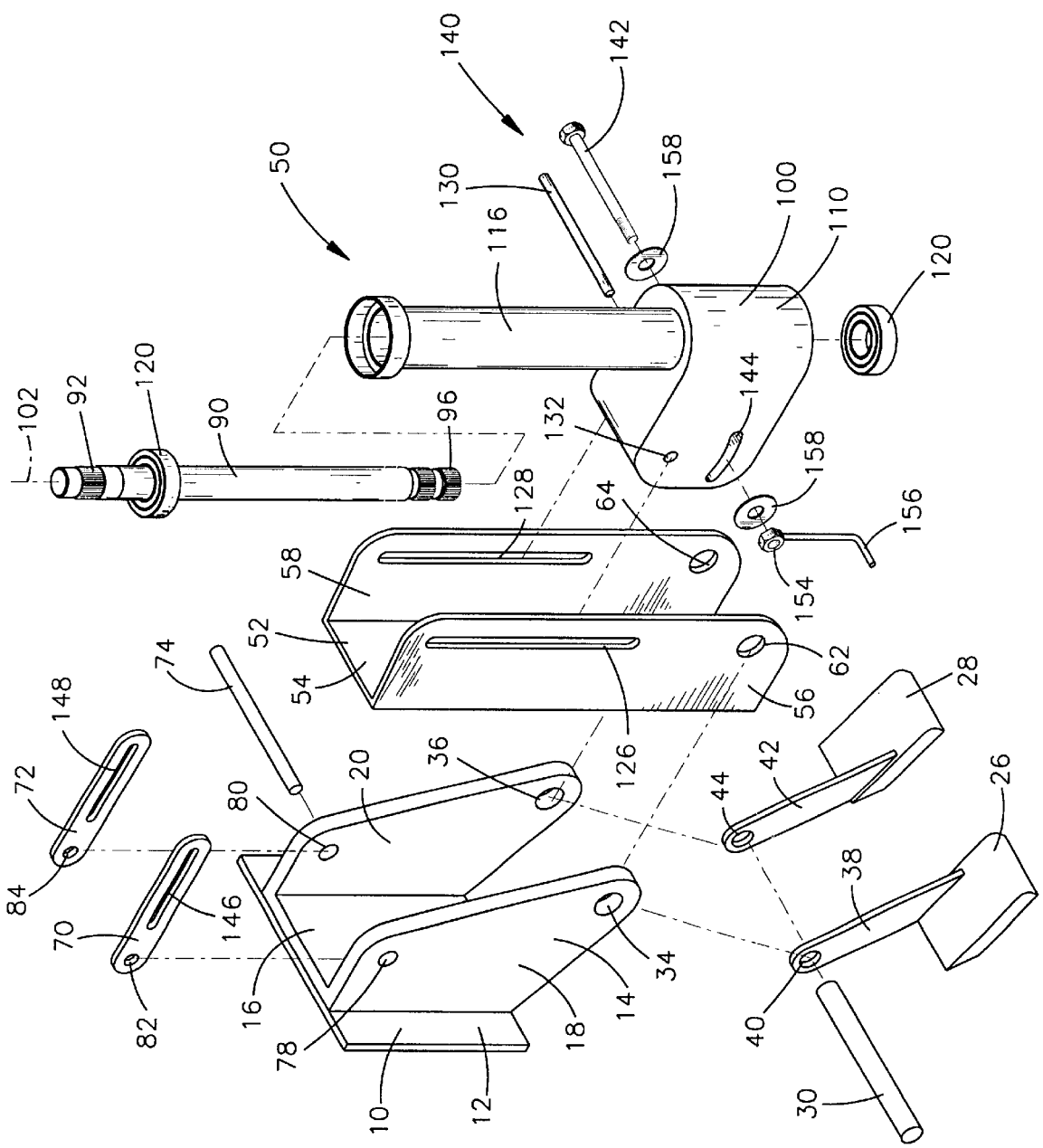
FIG. 3 is an exploded view of the apparatus of FIG. 1.

The pivot shaft 130 engages upper ends, as seen in FIG. 2, of the slots 126 and 128 to limit upward movement of the support 100 relative to the bracket member 52. The bolt 142 engages lower ends, as seen in FIG. 1, of the slots 126 and 128 to limit downward movement of the support 100 relative to the bracket member 52. The bolt 142 (FIGS. 1–3) engages opposite ends of the arcuate slot 144 in the support 100 to limit pivotal movement of the support relative to the bracket member 52. The bolt 142 engages opposite ends of the slots 146 and 148 in the arms 70 and 72 to limit pivotal movement of the steering column 50 relative to the mounting bracket 10.

After the support 100 is positioned relative to the bracket member 52 and the steering column 50 is positioned relative to the mounting bracket 10, the handle 156 is rotated in a clockwise direction, as viewed in FIG. 1, to cause the nut 154 to be screwed onto the bolt 142. As the nut 154 is screwed onto the bolt 142, the arms 70 and 72 are pressed toward each other and toward the bracket member 52. The bracket member 52 is clamped between the arms 70 and 72 to prevent movement of the support relative to the bracket member 52 and the steering column 50 relative to the mounting bracket 10.

Although the steering column 50 is shown as having a steering column member 90 movable relative to the bracket member 52, it is contemplated that the steering column may have a different construction. The steering column 50 may be constructed so that the only adjustment is the pivoting of the steering column relative to the mounting bracket 10.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a mounting bracket connectable with a vehicle frame;
   a foot pedal which controls a vehicle operation pivotally connected to the mounting bracket by a pivot shaft;
   a steering column pivotally connected to said mounting bracket by said pivot shaft, said steering column including a steering column member connectable with a steering wheel and rotatable to turn steerable vehicle wheels;
   a locking mechanism which locks said steering column in any one of a plurality of pivot positions relative to said mounting bracket; and
   a pair of arms extending between said mounting bracket and said steering column, each of said arms being pivotally connected to said mounting bracket.

2. An apparatus as defined in claim 1 wherein said steering column is movable relative to each of said arms.

3. An apparatus as defined in claim 2 wherein said locking mechanism includes a locking shaft extending through said steering column and a slot in each of said arms.

4. An apparatus as defined in claim 3 wherein said locking mechanism presses said arms toward each other and toward said steering column to lock said steering column in any one of a plurality of pivot positions relative to said mounting bracket.

5. An apparatus comprising:
   a mounting bracket connectable with a vehicle frame;
   a foot pedal which controls a vehicle operation pivotally connected to the mounting bracket by a pivot shaft;
   a steering column pivotally connected to said mounting bracket by said pivot shaft, said steering column including a steering column member connectable with a steering wheel and rotatable to turn steerable vehicle wheels; and
   a locking mechanism which locks said steering column in any one of a plurality of pivot positions relative to said mounting bracket;
   said steering column including a bracket member pivotally connected to said mounting bracket by said pivot shaft and a support connected with said bracket member which supports said steering column member for rotation about a longitudinal axis of said steering column member, said support being movable relative to said bracket member in a direction extending transverse to a longitudinal extent of said pivot shaft.

6. An apparatus comprising:
   a mounting bracket connectable with a vehicle frame;
   a foot pedal which controls a vehicle operation pivotally connected to the mounting bracket by a pivot shaft;
   a steering column pivotally connected to said mounting bracket by said pivot shaft, said steering column including a steering column member connectable with a steering wheel and rotatable to turn steerable vehicle wheels; and a locking mechanism which locks said steering column in any one of a plurality of pivot positions relative to said mounting bracket;

said steering column including a bracket member pivotally connected to said mounting bracket by said pivot shaft and a support member rigidly connected to the steering column and, pivotally connected to said bracket member which supports said steering column member for rotation about a longitudinal axis of said steering column.

7. An apparatus as defined in claim 6 wherein said support is pivotally connected to said bracket member by a steering column pivot shaft.

8. An apparatus as defined in claim 7 wherein said steering column pivot shaft is movable relative to said bracket member in a direction transverse to a longitudinal extent of said steering column pivot shaft.

9. An apparatus as defined in claim 8 wherein said locking mechanism locks said support in any one of a plurality of pivot positions relative to said bracket member and locks said steering column pivot shaft in any one of a plurality of positions along the direction transverse to the longitudinal extent of said steering column pivot shaft relative to said bracket member.

10. An apparatus as defined in claim 9 further including a pair of arms extending between said mounting bracket and said bracket member, each of said arms being pivotally connected to said mounting bracket, and said bracket member being movable relative to each of said arms.

11. An apparatus as defined in claim 10 wherein said locking mechanism includes a locking shaft extending through said bracket member, said support, and a slot in each of said arms.

12. An apparatus as defined in claim 11 wherein said locking mechanism presses said arms toward each other and toward said bracket member to lock said bracket member in any one of a plurality of pivot positions relative to said mounting bracket.

13. An apparatus as defined in claim 11 wherein said support includes an arcuate opening through which said locking shaft extends.

14. An apparatus as defined in claim 13 wherein said bracket member includes first and second side walls extending generally parallel to each other, said first side wall having a first slot and said second side wall having a second slot extending generally parallel to said first slot, said steering column pivot shaft extending through said support and said first and second slots and being movable along said first and second slots relative to said bracket member, said locking shaft extending through said first and second slots.

\* \* \* \* \*